United States Patent [19]

Kondo et al.

[11] Patent Number: 4,959,770
[45] Date of Patent: Sep. 25, 1990

[54] DATA PROCESSING SYSTEM EMPLOYING TWO ADDRESS TRANSLATORS, ALLOWING RAPID ACCESS TO MAIN STORAGE BY INPUT/OUTPUT UNITS

[75] Inventors: Megumu Kondo; Shuji Kamiya, both of Kawasaki; Kazuhiko Fukuoka, Machida; Masatsugu Shinozaki, Hadano; Hitoshi Sadamitsu, Kanagawa, all of Japan

[73] Assignees: Hitachi Ltd.; Hitachi Microcomputer Engineering, both of Tokyo, Japan

[21] Appl. No.: 52,870

[22] Filed: May 22, 1987

[30] Foreign Application Priority Data

May 23, 1986 [JP]  Japan .................. 61-117381

[51] Int. Cl.⁵ ........................................ G06F 12/00
[52] U.S. Cl. ........................... 364/200; 364/256.3
[58] Field of Search ... 364/200 MS File, 900 MS File

[56] References Cited

U.S. PATENT DOCUMENTS

| | | | |
|---|---|---|---|
| 3,723,976 | 3/1973 | Alvarez et al. | 364/200 |
| 3,800,291 | 3/1974 | Locke et al. | 364/200 |
| 4,155,119 | 5/1929 | DeWard et al. | 364/200 |
| 4,163,280 | 7/1979 | Mori et al. | 364/200 |
| 4,277,826 | 7/1981 | Collins et al. | 364/200 |
| 4,320,456 | 3/1982 | Heise et al. | 364/200 |
| 4,373,179 | 2/1983 | Katsumata | 364/200 |
| 4,392,200 | 7/1983 | Arulpragasam et al. | 364/200 |
| 4,403,283 | 9/1983 | Myntti et al. | 364/200 |
| 4,410,941 | 10/1983 | Barrow et al. | 364/200 |
| 4,481,573 | 11/1984 | Fukunaga et al. | 364/200 |
| 4,513,369 | 4/1985 | Sato | 364/200 |
| 4,513,371 | 4/1985 | Celio | 364/200 |
| 4,550,368 | 10/1985 | Bechtolsheim | 364/200 |
| 4,608,629 | 8/1986 | Nagel | 364/200 |
| 4,654,791 | 3/1987 | Ushiro | 364/200 |

OTHER PUBLICATIONS

"VAX Hardware Handbook", 1980, pp. 202,203,206,207,316,317.
Cohen et al., "The Design and Implementation of the MC68851 Page Memory Management Unit", IEEE Micro, vol. 6, No. 2, Apr. 1986, pp. 13-28.

*Primary Examiner*—Raulfe B. Zache
*Attorney, Agent, or Firm*—Antonelli, Terry, Stout & Kraus

[57] ABSTRACT

In a data processing system having a central processing unit, at least an input/output unit such as an MT unit or a floppy disk unit, a memory, an address bus, a first address translation unit, a second address translation unit, and an address selection unit, an output address from the central processing unit is translated by the first address translation unit to supply a resultant address to the address bus and, an output address from the input/output unit is directly fed to the address bus. An address on the address bus is delivered to the address selection unit, and the address selection unit selectively supplies the memory with the output address delivered from the first translation unit onto the address bus or with the resultant address obtained by translating the output address from the input/output unit by means of the second translation unit. In this configuration, the second address translation unit, to translate an address from the input/output unit, is disposed at an input to the memory, which eliminates the necessity for a translator on the side of the input/output device.

10 Claims, 6 Drawing Sheets

DATA PROCESSING SYSTEM EMPLOYING TWO ADDRESS TRANSLATORS, ALLOWING RAPID ACCESS TO MAIN STORAGE BY INPUT/OUTPUT UNITS

BACKGROUND OF THE INVENTION

The present invention relates to an address translation system, and in particular, to an address translation system which is used in a virtual storage system requiring address translation for an access to the main storage and is capable of facilitating access particularly from the input/output devices to the main storage.

In a virtual storage system which requires address translation to access the main storage device, it has been an essential problem to determine a location where the address translation is to be effected.

In a conventional example as illustrated in FIG. 1, for example, in the VAX-11 of the Digital Equipment Corp. (to be simply referred to as the VAX method herebelow; "VAX Hardware Handbook" (1980), pp. 202, 203, 206, 207, 316, and 317), as shown in FIG. 1, a logical address outputted from a central processing unit (CPU) 1 is translated into a physical address by means of an address translator 2 for the CPU 1. When an input/output device 5 directly accesses a storage device 3 without assistance from the CPU 1, namely, in the operation of a direct memory access (DMA), the logical address outputted from the input/output device 5 is translated into a physical address by means of an input/output address translator 4. These physical addresses thus obtained are supplied via an address bus 10 to the main storage 3.

According to the VAX method, when a plurality of input/output devices are utilized, it is necessary to develop an address translator dedicated to each input/output device or to each group of input/output devices and to connect the address translator between the input/output device 5 and the memory address bus 10.

In the VAX method as described above, if the address translation into a physical address necessary to access the storage device is achieved at the output each input/output device, a dedicated address translator is required to be prepared for each input/output device, which leads to a problem concerning the cost thereof.

As an improvement of the VAX method, an address translation method can be considered in which the cost on the input/output device side is lowered by removing the input/output address translator 4 from the system configuration of FIG. 1, whereas the address translator 2 for the CPU 1 is kept.

In this method, however, in which the address translator for the input/output device is omitted, and only the address translator for the CPU utilized, the physical address in the main storage unit must be directly outputted from each input/output device. Consequently, for example, when transfer of data involving a plurality of pages is to be executed between a magnetic disk unit and the main storage device, successive storage areas in the physical space of the storage device 3 must be allocated to the magnetic disk to facilitate the address generation of the magnetic disk unit. This leads to a problem that the advantageous features of the virtual storage system cannot be efficiently utilized, which means as a result the data transfer employing the DMA is limited to a one page operation.

An example of a data processing system not having an address translator at the output of an input/output device has been described in "The Design and Implementation of the MC68851 Paged Memory Management Unit", IEEE MICRO magazine vol. 6, No. 2 (April, 1986), pp. 13–28 (see particularly FIG. 1 in page 13).

Reference may be made to the U.S. Pat. No. 4,550,368 concerning a construction of memory systems of computers involving an address translation.

SUMMARY OF THE INVENTION

It is therefore an object of the present invention to provide an address translation system in which each input/output device can access the storage device by means of a logical address without providing an address translator for each input/output device, and a plurality of pages of data can be successively transferred in the DMA operation.

To accomplish the object, according to an aspect of the present invention, there is provided a data processing system including a central processing unit, at least an input/output device such as an MT unit or a floppy disk unit, a storage device, an address bus, a first address translation device, a second address translation device, and an address select device wherein an output address from the central processing unit is translated by the first address translation device to supply a resultant address to the address bus, an output address from the input/output device is directly fed to the address bus, an address on the address bus is delivered to the address select device, and the address select device selectively supplies the storage device with the output address delivered from the first translation device onto the address bus or the resultant address obtained by translating the output address from the input/output device by means of the second address translation means.

According to the present invention, the second address translation device to translate an address from the input/output device is disposed at an input to the storage device, thereby eliminating the necessity for a translator on the side of each input/output device. A logical address outputted from each input/output device is supplied to the address bus as it is, namely, without translation and is then translated into a physical address by the second address translation device disposed before the storage device so as to be used as an address to access the storage device. On the address bus, a physical address from the CPU supplied via the first address translation device and a logical address directly fed from the input/output device both exist These addresses need only be distinguished e.g., they can be separated as follows, namely, the address space on the bus is beforehand subdivided into an address space for the CPU and one for the input/output device so that the address select device effects address selection depending on the value of predetermined address bits on the address bus.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

An embodiment of the present invention will be described with reference to the accompanying drawings.

Figure 1:
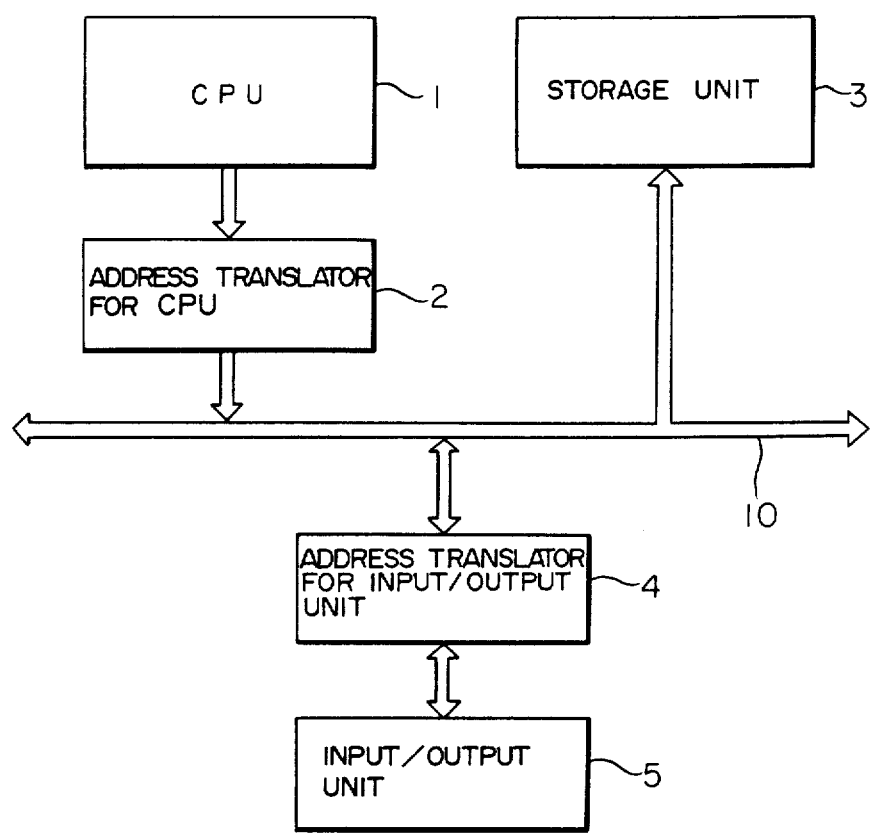
FIG. 1 is a schematic block diagram illustrating an example of a data processing system employing the prior art address translation method.
Figure 2:
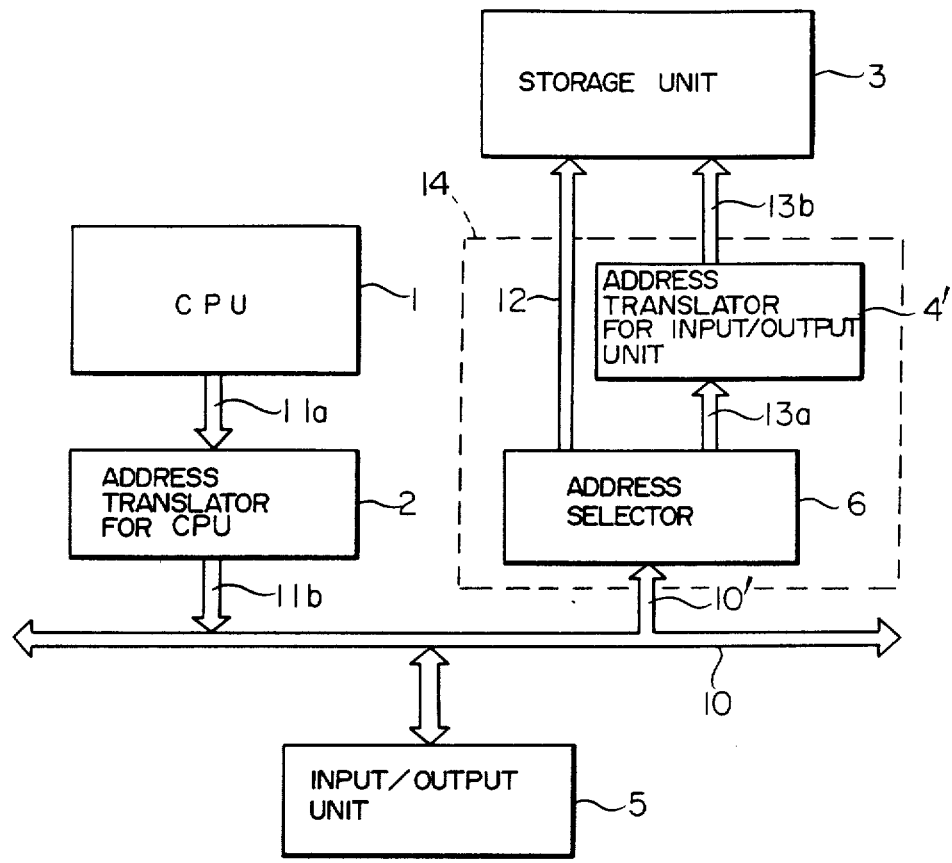
FIG. 2 is a block diagram showing an embodiment of a data processing system according to the present invention.

FIG. 2 is the basic configuration diagram of a data processing system implementing address translation according to the present invention in which a logical address 11a outputted from the CPU 1 is translated into a physical address 11b by means of an address translator 2 and the physical address 11b is inputted via an address bus 10 and an address path 10' to an address selector 6. On the other hand, a logical address outputted from an input/output device 5 is supplied to the address bus 10 as it is, namely, without any translation, so as to be inputted via the address path 10' to the address selector 6.

If the inputted address is a physical address associated with address translator 2 for the CPU 1, the address selector 6 sends the address via an address path 12 for the CPU 1 to a storage device 3. When the inputted address is a logical address outputted from the input/output device 5, the address selector 6 sends the address via an input/output path 13a to an address translator 4', which in turn translates the address into a physical address to be inputted via a path 13b to the storage device 3. Address selector 6 and address translator 4' thus couple address bus 10 to storage device 3 and so comprise a coupling unit 14.

The selection operation of the address selector 6 is effected in the similar manner to the operation conducted in the embodiment of FIG. 5 (or FIG. 6) which will be described later. For example, particular bits, e.g. two high-order bits of the output address from the address translator 2 for the CPU 1 and associated particular bits, e.g. two high-order bits of the output address from the input/output device 5 may be utilized to determine whether the access to the main storage 3 is requested from the CPU 1 or from the input/output device 5.

The data processing system of the embodiment includes three kinds of address spaces, namely, a logical address space A treated within the CPU 1, an address space B on the bus 10, and a physical address space C comprising a real storage area C1 and an input/output control register area C2.

Figure 3:
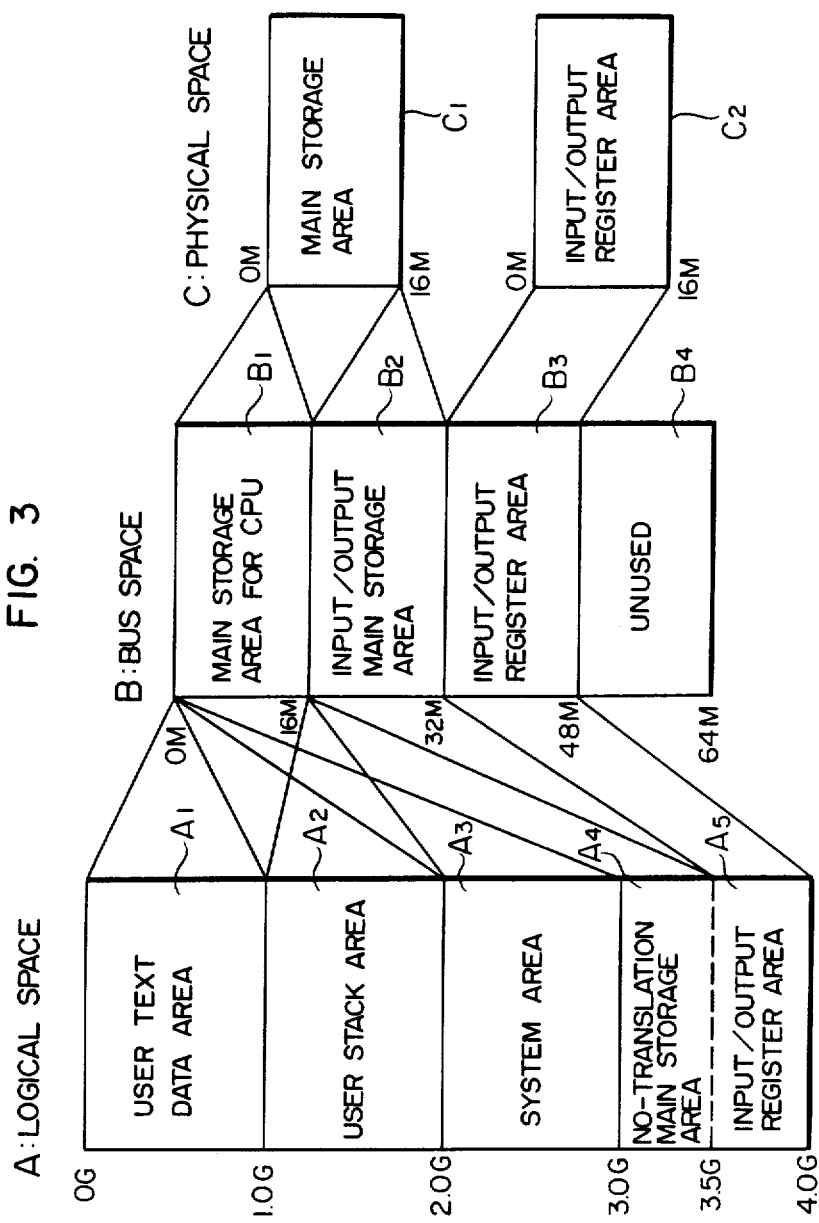
FIG. 3 is an explanatory diagram for explaining the configuration of the address space.

FIG. 3 is a diagram schematically showing the relationships among these three address spaces A-C. In this example, the logical address space A has a size of 4 gigabytes (GB) represented by a 32-bit logical address 11a. The logical address space A is allocated as follows, for example. Addresses 0-1.0 GB are allocated to an area A1 for the text and data of the user programs, addresses 1.0-2.0 GB are used for a user stack area A2, addresses 2.0-3.0 GB are reserved for a system area A3 in which the operating system and the programs and data shared among the operating system and a plurality of users are stored, addresses 3.0-3.5 GB are assigned to an area A4 used to access the main storage area C1 without the translation, and addresses 3.5-4.0 GB are allocated to an area A5 used to access the control register area C2 controlling the input/output devices. Each address of the areas A1-A3 is translated to the main storage area C1 through an address translation. For the no-translation area A4, the logical address minus first address of the area A4 (3GB) corresponds to the physical memory address in the main storage area C1. That is, the main storage can be accessed using the address in the no-translation area A4, simply by subtracting 3GB from it.

The address space B on the bus 10 has a size of, for example, 64 megabytes (MB), corresponding to the bit width, for example, 26 bits, of the bus 10 and is subdivided into four 16-MB areas B1-B4. The area B1 from 0 MB to 16 MB is used to access the main storage area C1 from the logical areas A1-A4, and each logical address of the address areas A1, A2, and A3 in the logical space is mapped onto the area B1 through an address translation. In addition, the no-translation area A4 in the logical space is given a corresponding the area B1 through a relation of the parallel displacement. The region B2 from 16 MB to 32 MB is used to access the main storage area C1 from the input/output device 5 via the address translator 4'. When viewed from the main storage, the regions B1 and B2 in the bus space are areas of the physical and logical addresses, respectively. The region B3 from 32 MB to 48 MB is provided to access the register area C2 controlling the input/output device. The region B4 from 48 MB to 64 MB is an unused area in this embodiment. Depending on the maximum value of the storage capacity of the main storage device installed in the system, the sizes of the physical space C and the bus space B can be set to values other than 16 MB described above.

Figure 4:
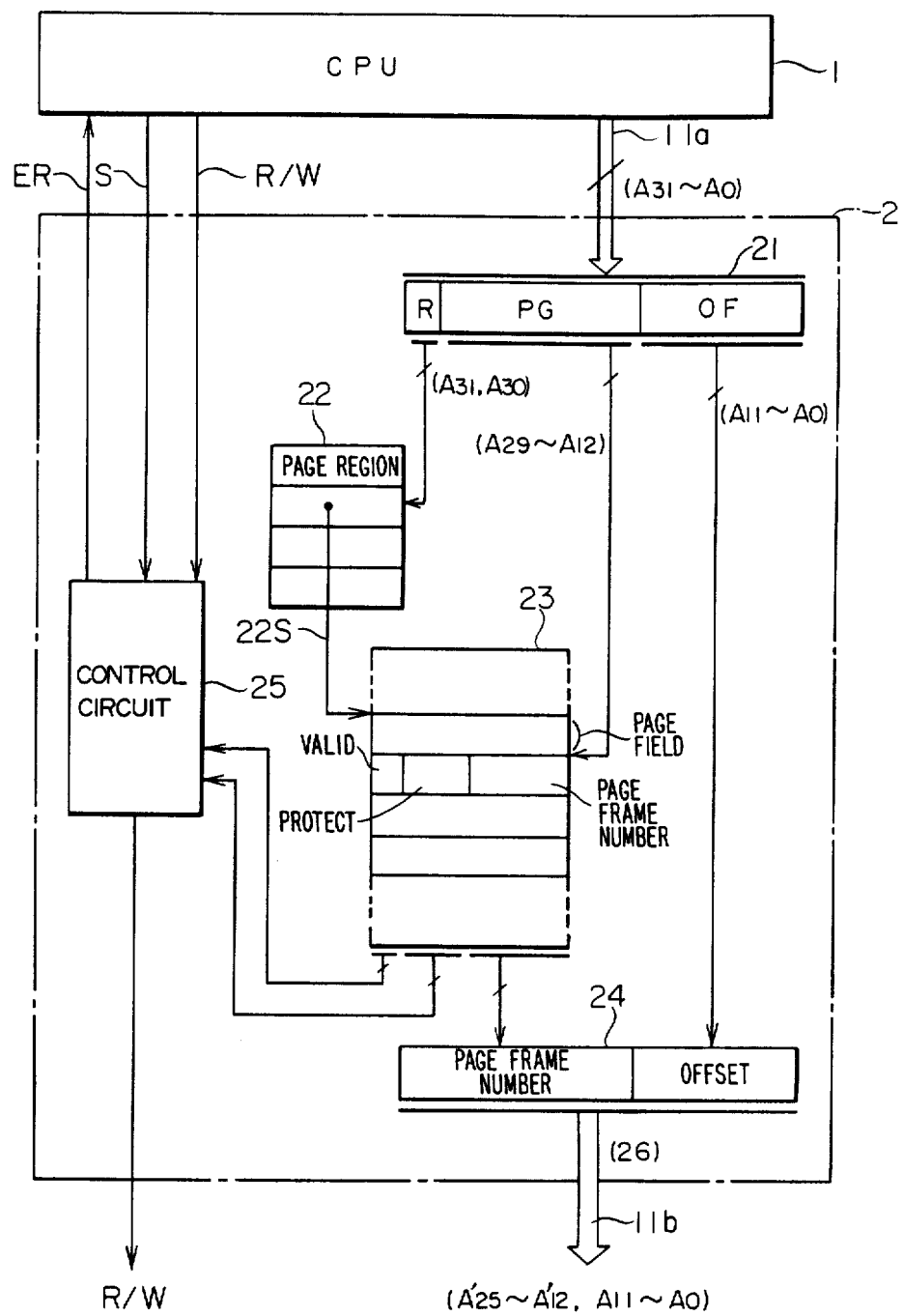
FIG. 4 is a schematic diagram useful in explaining in detail the address translator for the CPU.

FIG. 4 is a schematic diagram illustrating an example of a specific circuit configuration of the address translator 2 for the CPU 1.

The CPU 1 supplies the address translator 2 with a logical address 11a comprising 32 bits $A_{31}$-$A_0$, an R/W signal indicating a read or write operation, and a status signal S indicating whether the CPU is in the system mode or the user mode. The logical address 11a is inputted to a register 21 and is divided into two high-order bits $A_{31}$-$A_{30}$ as a region field R, 18 bits $A_{29}$-$A_{12}$ as a page field PG, and 12 low-order bits $A_{11}$-$A_0$ as a field of offset OF within page. The region field R addresses a region table 22, which causes a page region address 22S to be read. Reference numeral 23 denotes a page table memory including a plurality of records each comprising a valid bit V indicating whether the pertinent table entry is valid or not, a protection information PR restricting access to the pertinent page, and a page frame number PFN indicating a physical page in the main storage. From the page table memory 23, the content is read from an address obtained by adding the page region address 22S and the page field PG, and the PFN of 14 bits $A_{25}'$-$A_{12}'$ thus read is combined with the offset OF including 12 bits $A_{11}$-$A_0$ outputted from the register 21 to form the content of a register 24. The resultant address is outputted as a translated 26-bit bus address 11b.

The valid bit V and the protection information PR read from the memory 23 are inputted to a control circuit 25, which is also supplied with the control signal S and the R/W signal from the CPU 1. The control circuit 25 executes the address translation operation only if the valid bit, V is "1"; otherwise, a signal indicating an abnormality the address is applied to the CPU 1 as error signal ER. Access to the main storage is associated with four cases, namely, the read and write operations in the system and user modes. The protection information PR includes 4-bit information indicating whether these four access cases are allowed for each page. Prior to an address translation operation, the control circuit 25 identifies the current access case based on the control signals S and R/W and checks the protection information PR. Only if the check result is correct is the bus address 11$b$ caused to be outputted. If there exists an access not allowed for the pertinent page, the address translation is not conducted and the condition is reported to the CPU 1 by means of the error signal ER. Incidentally, the contents of the region table 22 and the page table 23 are controlled by the operating system included in the control programs.

Figure 5:
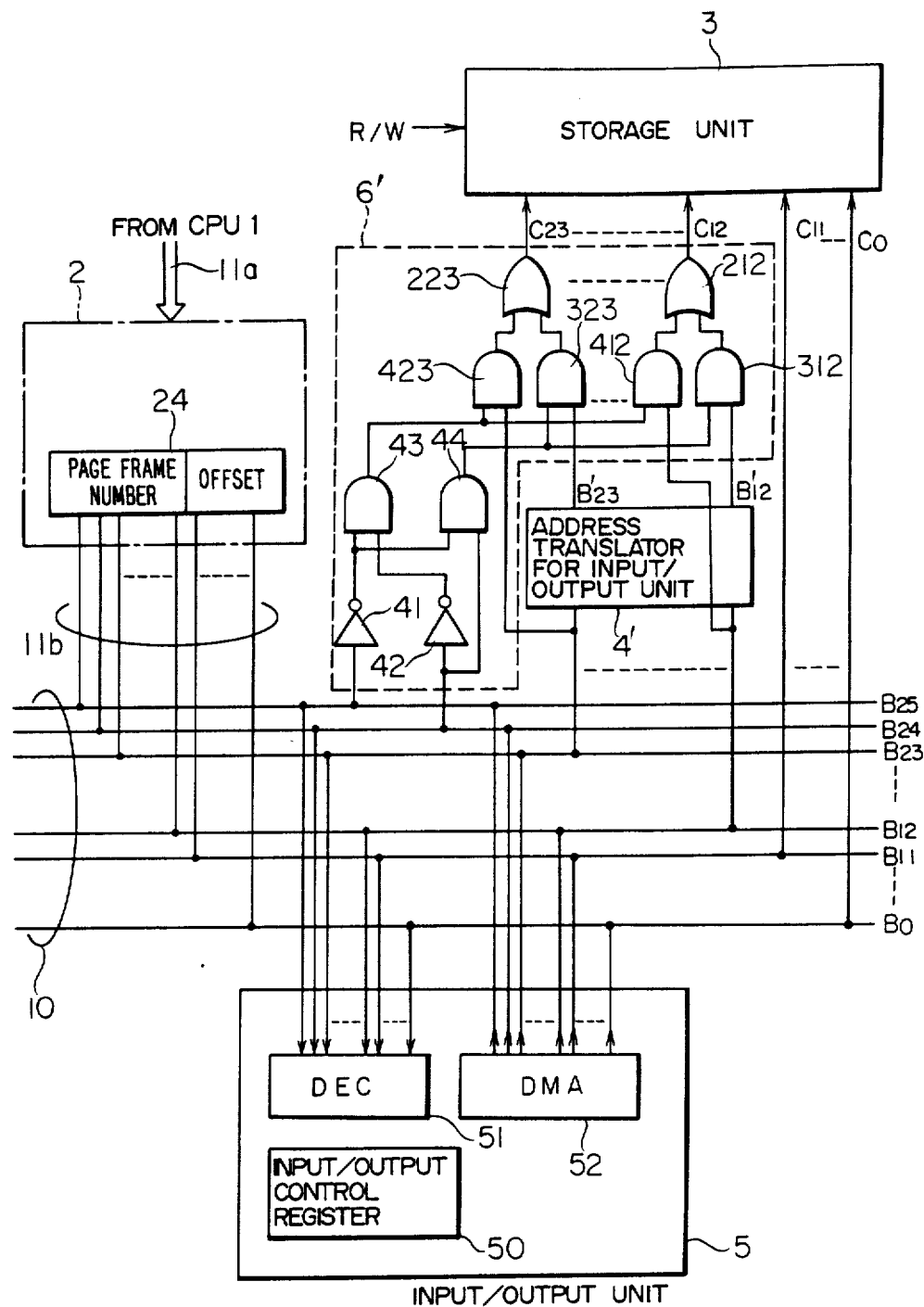
FIG. 5 is a schematic diagram showing in detail the primary sections, including the input/output address translation section, of another embodiment of a data processing system according to the present invention.

FIG. 5 is a schematic diagram illustrating another embodiment of a data processing system according to the present invention. The same reference numerals are assigned to the members as to the similar members of FIG. 2, and description thereof is given only when necessary.

First, the relationship between the 26-bit address signal $B_0$–$B_{25}$ on the bus 10 and the 24-bit main storage address $C_0$–$C_{23}$ will be described.

The 32-bit logical address ($A_{31}$–$A_0$) from the CPU 1 is translated into a 26-bit address ($A'_{25}$–$A'_{12}$, $A_{11}$–$A_0$) 11$b$ by the address translation circuit 2. In the address 11$b$, the respective bit positions correspond to the address bits $B_{25}$–$B_0$ on the bus 10. Of the address bits on the bus 10, 12 low-order bits $B_{11}$–$B_0$ are directly inputted to the memory address $C_{11}$–$C_0$ and the 12 high-order bits $B_{23}$–$B_{12}$ are fed to the input/output address translator 4' and the first set of two-input AND gates 423–412. The 12-bit address ($B'_{23}$–$B'_{12}$) which has undergone address translation in address translator 4' is inputted to the second set of two-input AND gates 323–312. Outputs from the first and second sets of AND gates are inputted to the OR gates 223–212, respectively with the correspondences of bits maintained, and outputs from these OR gates form a memory address ($C_{23}$–$C_{12}$).

In this embodiment, the AND gates 323–312 and 423–412 of the first and second sets, the OR gates 223–212, the inverters 41–42, and the AND gates 43–44 comprise a selection circuit 6', and either one of the two sets of AND gate groups 423–412 or 323–312 can be selected by means of an AND gate selection circuit, comprising the inverters 41–42 respectively, having inputs connected to the two high-order bits $B_{25}$–$B_{24}$ of the address bus and outputs connected to AND gates 43–44. In a case where the bits $B_{25}$–$B_{24}$ are both 0, the AND gates 423–412 of the first set are opened and hence the address bits $B_{23}$–$B_{12}$ are directly inputted to the memory address ($C_{23}$–$C_{12}$). In the case of $B_{25}$="0" and $B_{24}$="1", the AND gates 323–312 of the second set are opened and hence the translated address bits $B'_{23}$–$B'_{12}$ are supplied to the memory address ($C_{23}$–$C_{12}$).

Consequently, in the embodiment, when the CPU 1 accesses the main storage 3, the address translator 2 effects an address translation such that the two high-order bits $A'_{25}$–$A'_{24}$ of the output address are set to "0" (selection mode of the bus space 0–16 MB). When the CPU 1 accesses the input/output device 5, the bits $A'_{25}$–$A'_{24}$ are set to "1" and "0", respectively (selection mode of the bus space 32–48 MB). In this case, the address on the bus is decoded by an address decoder (DEC) 51 in the input/output device 5, and the predetermined content of the input/output control register 5 is accessed according to the result of the decode operation.

In the case where the input/output device 5 accesses the main storage 3, the input/output device 5 sets the bits $B_{25}$–$B_{24}$ to "0" and "1", respectively an arbitrary address to the bits $B_{23}$–$B_0$. When the input/output device 5 accesses the main storage 3 according to the direct memory access (DMA) mode, the 24 low-order bits of the address are successively updated with the values of $B_{25}$–$B_{24}$ kept unchanged, and the bits $B_{11}$–$B_0$ are directly fed to the storage device 3, whereas the bits $B_{23}$–$B_{12}$ are subjected to an address translation in the address translator 4' and the resultant bits are supplied to the main storage 3. The address translator 4' has a function substantially identical to that of the address translator 2 for the CPU 1 and develops the successive addresses outputted from a DMA 52 of the input/output device 5 into physical addresses of the main storage 3 in the page-by-page fashion. In this case, the allocation of each page in the main storage 3 can be arbitrarily effected by rewriting various tables in the address translator 4' by means of the operating system, thereby retaining the advantageous feature of the virtual storage system.

Figure 6:
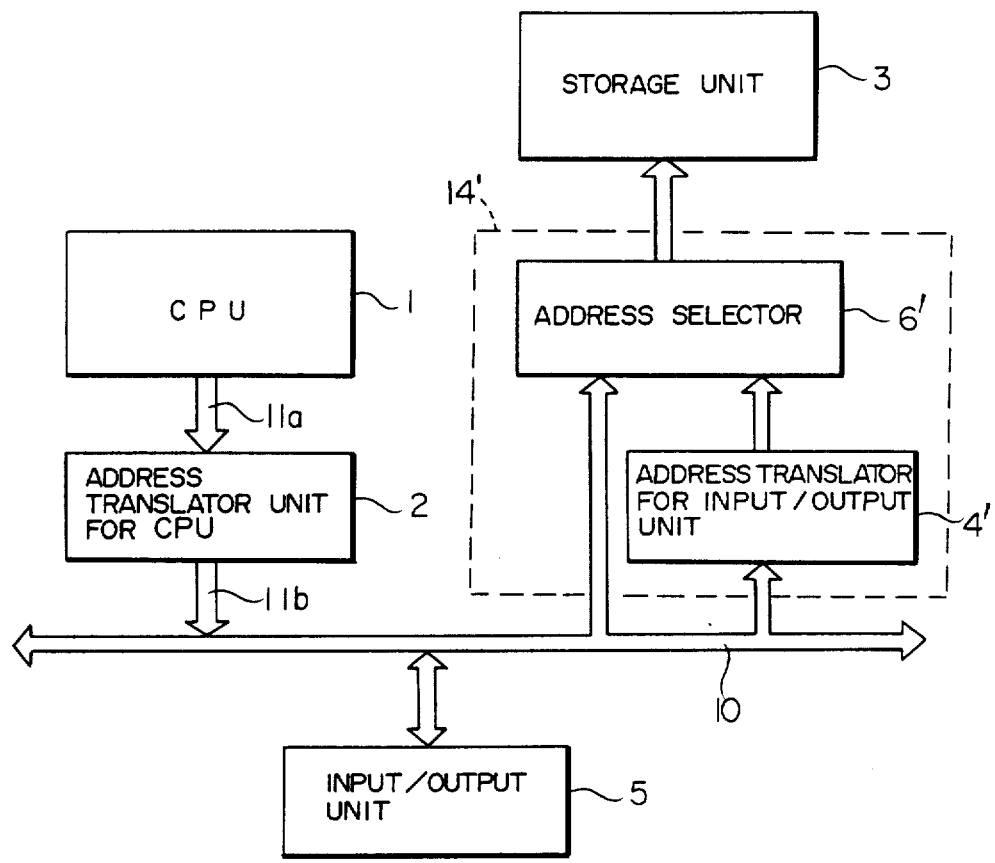
FIG. 6 is a block diagram illustrating the embodiment of FIG. 5.

FIG. 6 is a schematic block diagram representing the embodiment of FIG. 5 of which the details are the same as those described in conjunction with FIG. 5. The difference with respect to the embodiment of FIG. 2 is as follows. In the embodiment of FIG. 2, the address received via the address bus 10 first enters the address selection circuit 6. Based on the selection result of the address selection circuit 6, if the address is a physical address from the address translator 2 for the CPU 1, the physical address is directly sent to the storage device 3; whereas, if the address is a logical address from the input/output device 5, the logical address is sent to the input/output address translator 4' so as to be translated into a physical address, which is then supplied to the storage device 3. In contrast, in the case of the embodiment of FIG. 5 (i.e. FIG. 6), the address received via the address bus 10 is directly fed to the address selector 6' and the input/output address translator 4'. The address selector 6' checks the address to determine whether the address is a physical address from the address translator 2 for the CPU 1 or a logical address from the input/output device 5. Based on the result of the determination, if the address is a physical address from the address translator 2 for the CPU 1, the address is directly sent to the storage device 3; whereas, if the address is a logical address from the input/output device 5, a physical address is obtained by effecting an address translation on the logical address by means of the input/output address translator 4', another physical address is selectively delivered to the storage device 3. Address selector 6' and address translator 4' again make up a coupling unit 14' between address bus 10 and storage unit 3, just as in the embodiment of FIG. 2.

In the embodiment described above, although only one input/output device is representatively shown; actually, there are connected a plurality of input/output devices. Furthermore, the present invention is particularly effective in a case of a system involving a plurality of input/output devices. In such a case, the input/output register area in the bus space B and the input/output area in the physical space C of FIG. 3 must be allocated for each input/output device without causing an overlapped portion therebetween. Only if the area allocation is correctly achieved, the operation is completely conducted in the case of a system involving a plurality of input/output devices. Naturally, the present invention is applicable to a system involving only one input/output device.

As can be seen from the foregoing description, according to the present invention, there is not required a special device on the side of each input/output device to effect an address translation; consequently, the amount of hardware components of the input/output device and the man-hours necessary for the development thereof can be minimized. In addition, when compared with the method in which the DMA operation is effected by means of a physical address without using the address translation means for the input/output device, the method of the present invention is advantageous in that a great amount of data stored over a plurality of pages can be successively transferred.

While the invention has been described with reference to illustrative embodiments, this description is not intended to be construed in a limiting sense. Various modifications to the illustrative embodiments, as well as other embodiments of the invention, will be apparent to persons skilled in the art upon reference to this description. One of the points of the present invention resides in the provision of one input/output address translator and one address selector. For example, the specific circuit of the address selector may be other than that described in the text of the specification. It is therefore contemplated that the appended claims will cover any such modifications or embodiments as fall within the true scope of the invention.

We claim:

1. A data processing system comprising:
   a central processing unit;
   an address bus;
   first translation means coupling said central processing unit to said address bus for translating a first logical address from said central processing unit into a first physical address and applying the first physical address to said address bus;
   at least one input/output device connected to said address bus for applying a second logical address to said address bus;
   a storage device;
   coupling means coupling said address bus to said storage device and responsive to a characteristic of signals applied thereto indicative of the first physical address being on said address bus for supplying the first physical address from said address bus to said storage device and responsive to a characteristic of signals applied thereto indicative of the second logical address being on said address bus for translating the second logical address from said address bus into a second physical address and supplying the second physical address to said storage device.

2. A data processing system according to claim 1 wherein said coupling means distinguishes an address applied thereto as a physical address or as a logical address on the basis of predetermined address bits in the applied address.

3. A data processing system according to claim 1 wherein said coupling means comprises second translation means, and address selection means for receiving addresses directly from said address bus and applying the first physical address to said storage device and the second logical address to said second translation means for translation to the second physical address.

4. A data processing system according to claim 3 wherein said address selection means distinguishes an address applied thereto as a physical address or as a logical address on the basis of predetermined address bits in the applied address.

5. A data processing system according to claim 1 wherein said coupling means comprises (a) second translation means for receiving addresses directly from said address bus and translating the second logical address into the second physical address, and (b) address selection means for receiving address directly from said address bus, receiving the second physical address from said second translation, and applying the physical addresses to said storage device.

6. A data processing system according to claim 5 wherein said address selection means distinguishes an address applied thereto as a physical address or as a logical address on the basis of predetermined address bits in the applied address.

7. A data processing system comprising:
   a central processing unit;
   an address bus;
   first translation means coupling said central processing unit to said address bus for translating a first logical address from said central processing unit into a first physical address and applying the first physical address to said address bus;
   at least one input/output device connected to said address bus for applying a second logical address to said address bus;
   second translation means, for translating the second logical address into a second physical address;
   a storage device connected to said second translation means; and
   address selection means, connected to said address bus, said second translation means, and said storage device, said address selection means responsive to a characteristic of signals applied thereto for selectively supplying the first physical address from said address bus directly to said storage device and the second logical address from said address bus to said second translation means for translation into a second physical address and application of the second physical address to said storage device.

8. A data processing system according to claim 7 wherein said address selection means distinguishes an address applied thereto as a physical address or as a logical address on the basis of predetermined address bits in the applied address.

9. A data processing system comprising:
   a central processing unit;
   an address bus;
   first translation means coupling said central processing unit to said address bus for translating a first logical address from said central processing unit into a first physical address and applying the first physical address to said address bus;
   at least one input/output device connected to said address bus for applying a second logical address to said address bus;
   second translation means connected to said address bus for receipt of addresses therefrom and for translating the second logical address from said address bus into a second physical address;

a storage device; and address selection means, connected to said address bus, said second translation means, and said storage device, said address selection means responsive to a characteristic of signals applied thereto for selectively supplying the first physical address from said address bus directly to said storage device and the second physical address from said second address translation means to said storage device.

10. A data processing system according to claim 9 wherein said second translation means distinguishes an address applied thereto as a physical address or as a logical address on the basis of predetermined address bits in the applied address.

* * * * *